United States Patent Office 3,321,349
Patented May 23, 1967

3,321,349
PROCESS FOR THE MANUFACTURE OF ADHESIVE SHEETS, PARTICULARLY FOR PURPOSES OF DECORATION
Jean Niviere, Paris, France, assignor, by mesne assignments, to Ets. Morechal Company, Paris, France, a corporation of France
No Drawing. Filed Mar. 26, 1963, Ser. No. 267,955
Claims priority, application France, Apr. 9, 1962, 893,802
1 Claim. (Cl. 156—230)

This invention relates to a process for manufacturing adhesive sheets, and relates more particularly to an improved process for the manufacture of decorative sheets having a coating of pressure-sensitive adhesive thereon.

For some years, adhesive coated sheets have been used on an increased scale for the decoration of walls, panels, etc., the adhesive being the pressure-sensitive type. In most cases the base sheet consisted of a water-repellant film which may have coloring or printing to a greater or lesser degree on the side free from adhesive. In addition, the base sheet may be embossed or decorated with some suitable relief.

Two processes have heretofore been used to manufacture the adhesive film. The first process consisted of coating the adhesive, in solution or dispersion, on the film, which was then dried and covered with a protective sheet which was easily removable so that the adhesive film could be used without stripping off the adhesive.

In the second process, the adhesive, in solution or as a dispersion, was spread on an inert sheet and the coated sheet placed in contact with the film for the transfer of the adhesive. The inert sheet may constitute the protective sheet. The advantage of this process is that drying takes place on the inert base and therefore does not affect the transfer film. When the latter is thermoplastic in nature, shrinkage may occur at certain temperatures. Also, plasticized films may also be used more readily without any danger of migration of the plasticizer.

Despite the advantages mentioned in connection with the second process, it was used relatively little because of practical difficulties involved in its use. In most cases, the paper used had a silicone finish as the inert base. The nature of the silicones was of great importance; they had to be insoluble in the solvents employed in preparing the adhesive. Also, the adhesive had to be transferrable when dry, without leaving transfer traces and without requiring the application of a fixing coat onto the film.

Through extensive research, an adhesive formula has been discovered which entirely satisfies these requirements and which consists essentially of polymers of acrylic esters of aliphatic alcohols having 3 to 5 carbon atoms, polymerized to a definite degree, and with a minimum viscosity of 10,000 centipoises, and preferably 16,000 to 20,000 centipoises, in a 30% solution in the solvent mixture employed, which solvent mixture is free from aromatic components. The composition of this mixture makes it possible to reduce considerably the retention of solvent by the adhesive.

A resin ester is preferably added to the adhesive to increase the consistency and cohesiveness thereof, and there is also added a polyvinyl ether plasticizer.

The invention will be more readily understood by reference to the following example, it being fully understood that this example is not restrictive and that the invention extends to any variant in the same spirit.

*Example*

A paper base is coated with a 20 to 40% solution of an elastomer silicone rubber which can be reticulated under the effect of heat, in the presence of a known commerical catalyst. The solvent is xylene. After drying, a heat treatment is applied, for example, at 130 to 140° C., for purposes of reticulation, hence rendering the silicone insoluble.

To the solution obtained there is added a 70% solution of a polyvinyl ether, for example, polymethylvinyl ether or polybutylvinyl ether, in denatured alcohol, the proportion of this product to 30% polyacrylic ester being in the order of 10 to 25%.

There is also added an isomerized colophony ester, particularly a neutral glyceric ester, with an acid value of 6. The proportion of this ester, dissolved in essential oil in a proportion of 50%, can vary between 10 and 30% in relation to the 30% polyacrylic ester solution.

The mixture is diluted with denatured alcohol and essential oil for purpose of spreading it on the finished paper base. The diluted solution is limped. The solvent evaporates readily when hot and leaves no acetone residue in the dried adhesive coat. The solvent will not attack the silicone in the paper's finish.

The coated paper is then dried, the drying time being relatively short due to the fact that the solvent evaporates readily. The vapors can be recovered in a known manner. The finished paper coated with adhesive is placed in contact, in a heated state, with a polyvinyl chloride film which, in the present case, may contain large amounts of plasticizer and may be grained without difficulty. As described above, it may be pigmented and printed. The transfer takes place at the time of passage between rollers, and the roller that advances the film may be heated to a moderate temperature on the order of, for example, 60 to 85° C. The roller that advances the finished paper with adhesive may be cooled. An additional feature of the invention is that it is advantageous to leave the sheet of paper with adhesive and the transfer film in contact for a certain time, for example, for 24 hours, by winding them together, since "ageing" will definitely improve transfer.

When films coming directly from the calender are used, it is useful to stabilize them by means of a heat treatment under pressure to reduce shrinkage during the transfer. The heat treatment under pressure may take place at a higher temperature than that of the transfer.

It is to be understood that the foregoing detailed description is given merely by way of illustration and that many variations may be made therein without departing from the spirit of this invention.

What is hereby claimed and desired to be secured by Letters Patent is:

An improved process for the manufacture of adhesive sheets suitable for decoration of walls, panels and the like, which comprises applying a solution of a pressure-sensitive adhesive consisting essentially of a homopolymer of an acrylate of an alcohol of from 3 to 5 carbon atoms, said homopolymer being polymerized in a solvent mixture devoid of aromatic components, and said homopolymer having a viscosity of at least 10,000 centipoises in a 30% solution of the solvent, on a temporary support coated with a silicone-base, non-adhesive sizing and transferring said adhesive from said temporary support to a relatively permanent base, said solvent mixture devoid of aromatic components thereby in no way affecting the silicone-base sizing of the temporary support.

References Cited by the Examiner

UNITED STATES PATENTS

| | | | |
|---|---|---|---|
| 2,191,704 | 2/1940 | Bennett | 161—406 X |
| 2,985,554 | 5/1961 | Dickard | 161—406 X |
| 3,028,280 | 4/1962 | Hoffman | 161—406 X |
| 3,161,554 | 12/1964 | Blackford | 156—242 |
| 3,189,480 | 6/1965 | Franzen et al. | 117—122 |

EARL M. BERGERT, *Primary Examiner.*

M. L. KATZ, *Assistant Examiner.*